(12) United States Patent
Hoffmann

(10) Patent No.: US 10,968,885 B2
(45) Date of Patent: Apr. 6, 2021

(54) ROTOR BLADE OF A WIND TURBINE AND A WIND TURBINE

(71) Applicant: Wobben Properties GmbH, Aurich (DE)

(72) Inventor: Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 32 days.

(21) Appl. No.: 16/072,823

(22) PCT Filed: Jan. 26, 2017

(86) PCT No.: PCT/EP2017/051673
§ 371 (c)(1),
(2) Date: Jul. 25, 2018

(87) PCT Pub. No.: WO2017/129691
PCT Pub. Date: Aug. 3, 2017

(65) Prior Publication Data
US 2019/0032631 A1    Jan. 31, 2019

(30) Foreign Application Priority Data

Jan. 26, 2016 (DE) .................. 10 2016 201 114

(51) Int. Cl.
*F03D 1/06* (2006.01)

(52) U.S. Cl.
CPC ...... *F03D 1/0641* (2013.01); *F05B 2240/301* (2013.01); *F05B 2240/302* (2013.01);
(Continued)

(58) Field of Classification Search
CPC ..... F03D 1/0641; Y02E 10/72; Y02E 10/721; F16C 2360/31; F05B 2240/301; F05B 2240/302; F05B 2260/96
(Continued)

(56) References Cited

U.S. PATENT DOCUMENTS 2,562,227 A * 7/1951 Zobel .................. B64C 21/08
244/35 R
5,088,665 A    2/1992 Vijgen et al.
(Continued)

FOREIGN PATENT DOCUMENTS

CN      101952586 A    1/2011
CN      102536632 A    7/2012
(Continued)

OTHER PUBLICATIONS

Yang, SeungJoon, Drag and Noise Reduction of Flatback Airfoil by Span-wise Wavy Trailing Edge, University of Maryland (Year: 2019).*

(Continued)

*Primary Examiner* — David E Sosnowski
*Assistant Examiner* — Hakeem M Abdellaoui
(74) *Attorney, Agent, or Firm* — Seed Intellectual Property Law Group LLP

(57) ABSTRACT

A rotor blade having a suction side and a pressure side for a wind power installation, comprising: a rotor blade root of a hub region for the attachment of the rotor blade to a rotor hub, and a rotor blade tip arranged toward that side of a tip region which is averted from the rotor blade root. In the region of the hub region, the rotor blade has, at least in part, a thickness profile which has a thorn-like extension at its trailing edge, wherein, in the region of the hub region, the thickness profile has, at least in part, a first thorn-like extension at the trailing edge at the suction side, and a second thorn-like extension at the trailing edge at the pressure side, and, in the region of the hub region, the thickness profile has, at least in part, a flow stabilizer and/or a vortex generator on the suction and/or pressure side.

29 Claims, 10 Drawing Sheets

(52) U.S. Cl.
CPC ....... *F05B 2260/96* (2013.01); *F16C 2360/31* (2013.01); *Y02E 10/72* (2013.01)

(58) Field of Classification Search
USPC .......... 416/223 R, 223 A, 228, 243; 415/4.3, 415/4.5, 914
See application file for complete search history.

(56) References Cited

U.S. PATENT DOCUMENTS

| | | | |
|---|---|---|---|
| 5,531,406 A * | 7/1996 | Redekopp | B64C 21/025 244/208 |
| 8,376,703 B2 * | 2/2013 | Carroll | F03D 1/0675 416/23 |
| 8,414,261 B2 | 4/2013 | Bonnet | |
| 8,419,363 B2 | 4/2013 | Madsen et al. | |
| 8,419,373 B1 | 4/2013 | Fukami | |
| 8,814,525 B2 | 8/2014 | Petsche et al. | |
| 9,039,381 B2 | 5/2015 | Grife et al. | |
| 9,403,291 B2 | 8/2016 | Woerdeman et al. | |
| 9,581,133 B2 | 2/2017 | Yao | |
| 9,617,974 B2 | 4/2017 | Singh | |
| 9,677,538 B2 | 6/2017 | Mashue et al. | |
| 9,759,185 B2 | 9/2017 | Bohlen | |
| 9,897,067 B2 * | 2/2018 | Grasso | F03D 1/0641 |
| 10,100,808 B2 * | 10/2018 | Erbsloh | F03D 1/0658 |
| 2007/0224029 A1 * | 9/2007 | Yokoi | F03D 3/005 415/4.2 |
| 2010/0310374 A1 | 12/2010 | Dehlsen | |
| 2013/0094970 A1 * | 4/2013 | Fukami | F03D 1/0633 416/223 R |
| 2013/0209264 A1 * | 8/2013 | Mashue | F03D 1/0683 416/241 R |
| 2014/0227101 A1 * | 8/2014 | Yao | F03D 1/0608 416/236 R |
| 2014/0271213 A1 * | 9/2014 | Yarbrough | F03D 3/061 416/223 R |
| 2015/0003985 A1 | 1/2015 | Caruso et al. | |
| 2015/0176563 A1 * | 6/2015 | Grasso | F03D 1/0633 416/147 |
| 2016/0047357 A1 * | 2/2016 | Erbsloh | F03D 1/0675 416/244 R |
| 2016/0138563 A1 | 5/2016 | Altmikus | |
| 2016/0305398 A1 * | 10/2016 | Carroll | F03D 1/0675 |
| 2017/0016426 A1 | 1/2017 | Kuhn | |
| 2018/0238298 A1 * | 8/2018 | Grasso | F03D 7/024 |
| 2019/0024631 A1 * | 1/2019 | Tobin | F03D 1/0683 |

FOREIGN PATENT DOCUMENTS

| | | |
|---|---|---|
| CN | 102808725 A | 12/2012 |
| CN | 104595110 A | 5/2015 |
| CN | 104704233 A | 6/2015 |
| DE | 102013101232 A1 | 8/2013 |
| DE | 102008052858 B9 | 6/2014 |
| DE | 102013210901 A1 | 12/2014 |
| DE | 102014108917 A1 | 12/2014 |
| DE | 102014206345 A1 | 10/2015 |
| EP | 2568166 A1 | 3/2013 |
| JP | 2003-336572 A | 11/2003 |
| JP | 2014-513773 A | 6/2014 |
| WO | 2008/003330 A1 | 1/2008 |
| WO | 2013/054404 A1 | 4/2013 |
| WO | 2013076009 A1 | 5/2013 |
| WO | 2013152009 A1 | 10/2013 |
| WO | 2013153009 A1 | 10/2013 |
| WO | 2014025252 A1 | 2/2014 |

OTHER PUBLICATIONS

Yang, SeungJoon, Aerodynamics and Aeroacoustics of Spanwise Wavy Trailing Edge Flatback Airfoils: Design Improvement, Virginia Tech (Year: 2015).*

Jonathon P. Baker and C.P. van Dam, Drag Reduction of Blunt Trailing-Edge Airfoils, University of California (Year: 2008).*

Heinzelmann, "Strömungsbeeinflussung bei Rotorblättern von Windenergieanlagen mit Schwerpunkt auf Grenzschichtabsaugung," doctoral thesis, Berlin, Germany, Jun. 23, 2011, 106 pages (with English summary on p. 4).

Standish et al., "Aerodynamic Analysis of Blunt Trailing Edge Airfoils," *Journal of Solar Energy Engineering* 125:479-486, Nov. 2003 (11 pages).

* cited by examiner

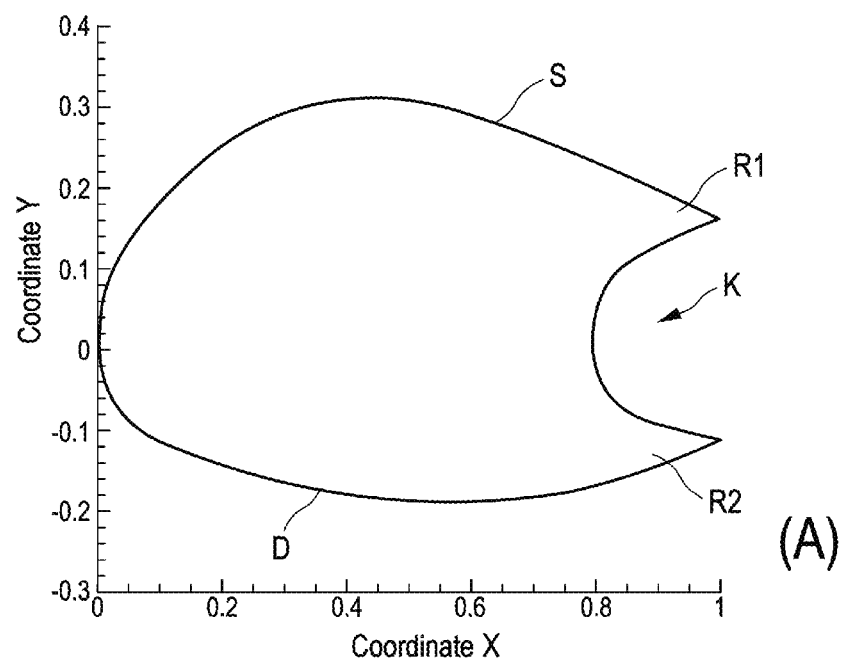
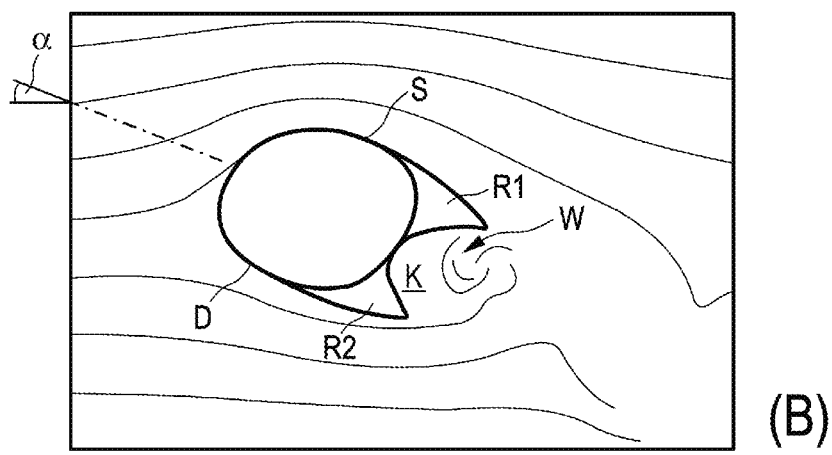
Lift: 5.56  Drag: 1.88  Ratio L/D: 2.96
FIG. 8

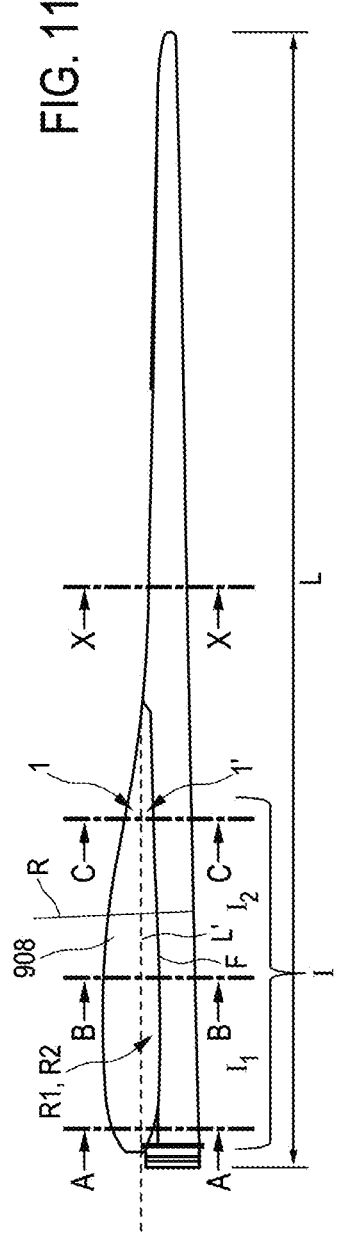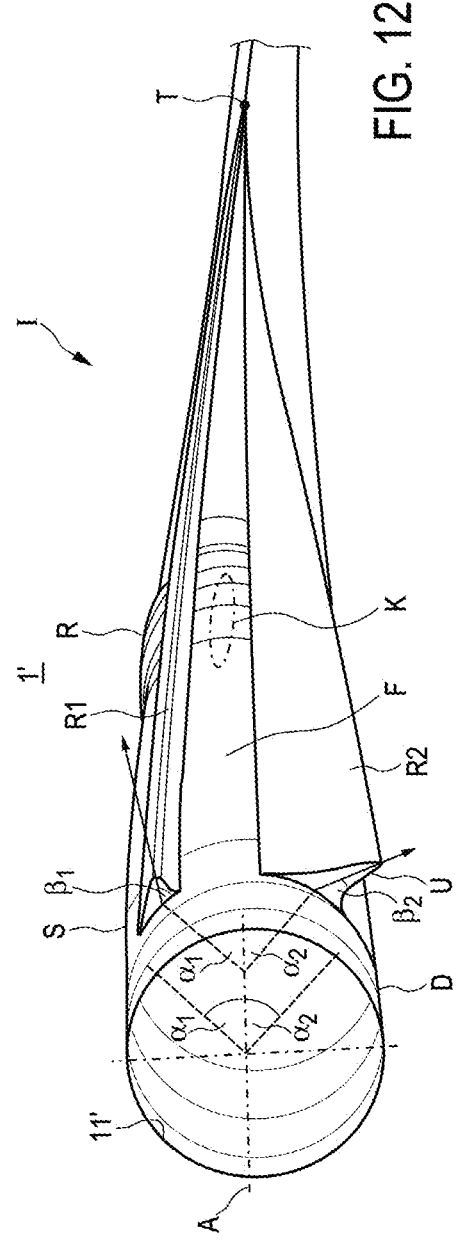

ROTOR BLADE OF A WIND TURBINE AND A WIND TURBINE

BACKGROUND

Technical Field

The invention relates to a rotor blade of a wind power installation, and to a wind power installation.

Description of the Related Art

Rotor blades for a rotor of a wind power installation are generally known. Such rotor blades have a profile (cross-sectional profile) which makes allowance for the special aerodynamic requirements.

A wind power installation has, for example, an aerodynamic rotor with multiple rotor blades, and is shown by way of example in FIG. 1. The aerodynamic characteristics of such rotor blades influence the performance of the rotor blades and thus of the wind power installation. To increase the performance of a rotor blade, the profiles thereof are optimized. In order, for example, to ensure electricity production which is as constant as possible in regions with light winds, specifically in particular at inland sites, the aerodynamic rotors have a rotor diameter which may amount to more than 80 meters. In the case of such large wind power installations, and thus also very large rotor blades, this leads to a high rotor blade weight. The large and heavy rotor blades generate high loads, which act on the wind power installation during operation. Furthermore, the production and transport to the respective erection sites is complex and difficult. A realization of a two-part rotor blade, which would be more expedient for the transport of such large rotor blades, is however possible only to a limited extent owing to the acting loads and the reduction in stability that additionally arises as a result of the parting point.

The design of a profile of a rotor blade, in particular in the hub region, is subject to certain requirements, which differ from those for example in the tip region of the rotor blade. An overview is provided for example by the doctoral thesis by Barbara Souza-Heinzelmann in "Strömungsbeinflussung bei Rotorblattern von Windenergieanlagen mit Schwerpunkt auf Grenzschichtabsaugung" ["Flow manipulation at rotor blades of wind power installations, with a focus on boundary layer suction"] (Berlin, 23 Jun. 2011). Said doctoral thesis provides a basic explanation of different forms of flow manipulation in the aerodynamic design and flow around the rotor blade. In particular, FIGS. 4-3 of the doctoral thesis shows the division of the rotor blade into three regions, specifically the hub region, the central region and the tip region. Measures for flow manipulation may be for example the vortex generators or spoilers shown in FIGS. 5-7, or the band re-layer fences shown in FIGS. 5-8.

An excellent design of a profile in the hub region of a rotor blade of the applicant is discussed in said doctoral thesis in FIGS. 4-6. For example, WO 2013/152009 has disclosed a concept of a rotor blade connection to the hub with an increasing profile depth of a rotor blade. The applicant's DE 102013/210901 A1, for example, discloses the combination of this concept with boundary-layer fences or the like. A possibility of a rotor blade connection which fundamentally differs from this is provided by a decreasing profile depth in the hub region, in order to thus transition from the form of a standard profile in the central region of the rotor blade via an elliptical profile cross section to an approximately circular profile cross section for the hub connection—this is described for example in DE 102008052858 B9, in which a truncated trailing edge of a rotor blade is provided.

A fundamental problem in the case of truncated trailing edges of rotor blade profiles—so-called flat back profiles—is however, even in the light of the limited lift characteristics that are still basically present, the flow separation at the trailing edge. A good overview of this problem is given for example in the article by Standish et al. "Aerodynamic Analysis of Blunt Trailing Edge Airfoils" in Journal of Solar Energy Engineering, volume 125, pages 479-486 (November 2003).

The German Patent and Trade Mark Office searched the following prior art in the priority application relating to the present PCT application: DE 10 2014 108 917 A1, WO 2014/025 252 A1, WO 2013/153 009 A1, DE 10 2013 210 901 A1, EP 2 568 166 A1, DE 10 2014 206 345 A1, DE 10 2008 052 858 B9 and DE 10 2013 101 232 A1.

BRIEF SUMMARY

Provided is a rotor blade which, in the hub region, exhibits moderately good lift values and reduces the problem of trailing-edge turbulence. In particular, provided is rotor blade to have a selectively increasing profile thickness or decreasing profile thickness in the hub region, or at any rate to be designed, in the region of this profile thickness in the hub region, such that it can be transported relatively easily.

WO 2014/025 252 A1 was filed before the priority date of the present application and first published after said priority date, and is thus relevant to the present application only with regard to novelty—WO 2014/025252 A1 presents an aerodynamic profile with an asymmetrical, indented, tail-like channel body (swallowtail-shaped) at a trailing edge of the aerodynamic profile, which can be utilized for example for a wind turbine. The asymmetrical, indented, tail-like (swallowtail-shaped) channel body has a first and a second part, between which the channel (cavity) is formed. The first and the second part each have an upper and a lower outer surface, which is in each case straight and which terminates correspondingly flush with a top side and an underside of the aerodynamic profile.

During the course of the continuous further development of wind power installations, the rotor diameter will increase in order to be able to extract even more energy from the wind. Owing to the natural laws of aerodynamics and structural mechanics, however, it is not possible, or is possible only to a limited extent, to increase only the length of the rotor blades and, for example, maintain the width or profile depth, because, in this way, without further aerodynamic aids, it is not possible to realize clean flow states in the range of application around the aerodynamic profile. Owing to the ever-increasing surface area of the rotors, the sound emission level of the wind power installation as a whole thus also increases continuously, and this must likewise be taken into consideration.

The invention has recognized that, basically, the design of a rotor blade with an aerodynamic standard profile in the tip region and central region to form a rotor blade with an aerodynamic thickness profile—in particular flat back profile with truncated trailing edge, in particular in the hub region—is advantageous. This permits a reduction in blade depth, while nevertheless maintaining the same lift characteristics.

Based on this consideration, the invention has recognized that it is basically also advantageous—that is to say, in accordance with the applicant's concept with further increasing profile thickness (but not imperatively) as in WO 2013/153009 A1—to design the rotor blade, in the region of the hub region, at least in part, as a thickness profile which has a thorn-like extension at its trailing edge. A trailing edge is, in particular in accordance with this understanding, to be understood to mean the flat trailing edge, and the thorn-like extension is considered in relation thereto. An actual, that is to say pointed, trailing edge is then formed at the end of the thorn-like extension.

Owing to a thorn-like extension of said type, it is possible not only for the profile depth to be made advantageously small in the hub region, but also for vortex detachment and thus noise emissions to also be configured advantageously.

According to the invention, it has proven to be advantageous that, in the region of the hub region, the rotor blade has, at least in parts, a thickness profile, and the thickness profile has a first thorn-like extension at the trailing edge at the suction side, and a second thorn-like extension at the trailing edge at the pressure side.

These and other advantageous refinements of the invention will emerge from the subclaims and, in detail, specify advantageous possibilities for realizing the above-discussed concept in the context of the stated problem and with regard to further advantages.

In the region of the hub region, the thickness profile is advantageously designed as a flat back profile, that is to say with a truncated trailing edge. In the hub region, the trailing edge is advantageously a flat trailing edge, which has a relative thickness, in particular a relative thickness of greater than 5%.

The thickness profile advantageously has a relative thickness of greater than 40%, in particular greater than 45%. A relative thorn depth measured from the trailing edge advantageously lies below 25% and/or at least above a relative thickness of the trailing edge, in particular above 5%. This is again, in particular in accordance with this understanding, to be understood rather to mean the flat trailing edge, and the relative thickness and the thorn-like extension are considered in relation thereto.

Such a profile, also referred to as a rose thorn profile, corresponds to a modification according to the abovementioned refinement of a flat back profile, and correspond here to an advantageous refinement of the invention.

It is basically possible to realize a further reduction of the profile depth, or of the rotor blade width. The thickness profile advantageously has a relative thickness of greater than 50%, in particular greater than 75%.

By means of the end edge piece of a thorn-like extension, which preferably tapers off thinly in twofold fashion, that is to say at the suction side and that the pressure side, the sound emissions are reduced in relation to the flat back profile.

By means of the special shape of the trailing edge thorns, a controlled trailing-edge vortex formation can be achieved. Specifically, it has been found that, in particular in the case of thorns of twofold design attached at the suction and the pressure side, a vortex can be stabilized in the channel between the suction-side thorn and the pressure-side thorn (or at any rate below or above a thorn), and the profile nevertheless exhibits relatively good lift values in the region of the hub region. It has advantageously been found that stable, albeit pulsing or oscillating formation of a vortex in the channel or below or above a thorn is possible even in the case of relatively turbulent flow or varying winds. By means of a stable, albeit pulsing or oscillating formation of a vortex in the channel or below or above a thorn, the effective profile depth is increased, and thus a lift characteristic of the profile is improved.

A relative thorn depth measured at the trailing edge advantageously lies below 25% and/or at least above a relative thickness of the trailing edge, in particular above 5%, wherein a maximum relative thorn depth advantageously lies between 15 and 25%. This is again, in particular in accordance with this understanding, to be understood rather to mean the flat trailing edge, and the relative thickness and the relative thorn depth of the thorn-like extension are considered in relation thereto.

It is advantageously the case that, in the region of the hub region, the trailing edge has, at least in part, a serrated form, that is to say is formed as a jagged trailing edge, so to speak. A jagged trailing edge may be formed on the suction side and/or on the pressure side, or only on the pressure and/or suction side, or else over the entire flat profile of the trailing edge. This is again, in particular in accordance with this understanding, to be understood rather to mean the flat trailing edge, though possibly also a pointed trailing edge of the thorn-like extension, and the jagged trailing edge is considered in relation thereto; that is to say, in particular, a serrated form is provided on the end of the thorn-like extension.

A refinement according to the invention has proven to be advantageous in which, in the region of the hub region, the thickness profile has, at least in part, a flow stabilizer on the suction side and/or pressure side. In particular, a flow stabilizer may be selected from the group comprising spoiler, boundary-layer fence, boundary-layer suction means.

In addition or alternatively, a refinement according to the invention has also proven to be advantageous in which, in the region of the hub region, the thickness profile has, at least in part, a vortex generator on the suction side and/or pressure side. In particular, a vortex generator is selected from the group comprising: fin, stud, dimple, web or similar turbulators, a blow-out structure or suction structure. With a vortex generator, a boundary layer thickness in the case of a turbulent flow can be enlarged; that is to say made larger than in the case of a laminar flow. Since the flow speed however increases more rapidly with increasing distance than in the case of a laminar flow, this leads to a higher energy of the flow, and the higher energy makes the flow less sensitive to detachment from the rotor surface. Vortex generators or similar turbulators are, in general, small, artificially applied surface obstructions. They generate vortices and cause a laminar boundary layer flow to change into a turbulent boundary layer flow. The flow separation is delayed. Turbulators include, for example, transversely running rails, small vertical plates, or bores. A further possibility for causing the boundary layer flow to changeover is the blow-out or suction turbulator. This is a series of fine bores through which air is blown into or sucked out of the boundary layer transversely with respect to the flow direction.

In a particularly preferred refinement, it is provided that, in a first region, specifically in the hub region in a first region close to the hub, the thickness profile has the thorn-like extension at its trailing edge, and in a second region, specifically in the hub region in a second region remote from the hub, the thickness profile the trailing edge is a flat trailing edge without the thorn-like extension.

The concept of a local maximum between the root and tip of the rotor blade can be implemented particularly advantageously in combination with the thorn-like extension. Provision is preferably made for the thickness profile to have a maximum profile depth in the hub region between the first region, in particular the region close to the hub in the hub region, and the second region, in particular the region remote from the hub in the hub region.

Provision is preferably made for a relative profile thickness, which is defined as a ratio of profile thickness to profile depth, to have a local maximum in a region, preferably central region, between rotor blade root of the hub region and rotor blade tip of the tip region.

Preferably, the relative profile thickness of the local maximum may amount to 35% to 50%, and/or the rotor blade may have absolute profile depth of 1500 mm to 3500 mm in the region of the local maximum.

Provision is preferably made for the rotor blade to be made up of a first and a second rotor blade section, and for the first rotor blade section to have the rotor blade root and for the second rotor blade section to have the rotor blade tip, and for the first and the second rotor blade section to be connected to one another at a parting point. The parting point is preferably arranged in the central region between rotor blade root and rotor blade tip and/or in the region of the local maximum.

The abovementioned refinements have proven to be particularly advantageous in the case of a rotor blades with absolute dimensions as discussed below.

Provision is preferably made for the rotor blade to have, in a first region, in particular in a region close to the hub in the hub region, an absolute profile depth of at least 3900 mm, in particular an absolute profile depth in a range from 4000 mm to 8000 mm.

These absolute profile depths are 15%-30% smaller than in the case of a different blade without thorn-like extension but with similar lift values.

Provision is preferably made for the rotor blade to have, in the range from 90% to 95% of the total length proceeding from the rotor blade root, an absolute profile depth of at most 1000 mm, in particular an absolute profile depth in a range from 700 mm to 400 mm.

These absolute profile depths are also 15%-30% smaller than in the case of a different blade without thorn-like extension but with similar lift values.

Provision is preferably made for the rotor blade to have, in the central region (II), a profile depth which corresponds to approximately 20% to 30%, in particular approximately 25%, of the profile depth in the hub region.

In the context of a further refinement, provision may be made whereby,
  in the hub region, in a first region, in particular in a region close to the hub in the hub region, the thickness profile has a first relative thickness and the thorn-like extension at its flat trailing edge, and
  in the hub region, in a second region, in particular in a region remote from the hub in the hub region (I), the trailing edge of the thickness profile has a pointed trailing edge without a thorn-like extension or has a flat trailing edge with a second, relatively small thickness and likewise with the thorn-like extension.

These and other further advantageous refinements will emerge from the further subclaims and specify, in detail, advantageous possibilities for realizing the above-discussed concept in the context of the stated problem and with regard to further advantages.

The thickness profile advantageously has a relative thickness of greater than 50%, in particular great 75%. Preferably, for the rotor blade, the thickness profile is realized in the form of a substantially elliptical, oval or cylindrical core. In particular in the case of an ideal or oval ellipse, the thickness profile advantageously has a relative thickness of greater than 50%, in particular great in 75%. The core preferably develops into a cylindrical shape toward the hub connection, that is to say the rotor blade has a thickness profile with a relative thickness of up to 100%.

It is particularly advantageous if, in the case of a relative thickness of greater than 75%, the core is formed as a wound part. In particular, for this purpose, the core may be formed as an (e.g., glass- or carbon-)fiber-reinforced (GRP) profile. For this purpose, it is for example the case that filaments or mats or similar fibers are wound onto a mandrel which is later removed again, such that the core remains as a wound part, in particular GRP wound part.

The rotor blade can be produced particularly efficiently in the hub region by virtue of the thorn-like extension being attached, in particular only the thorn-like extension being attached, to the core as an abovementioned thickness profile with a relative thickness of greater than 50%, in particular greater than 75%, at its trailing edge with a relative trailing edge thickness. A substantially cylindrical or oval wound part with a thickness profile of an advantageous relative thickness of greater than 50%, in particular greater than 75%, and with a thorn-like extension is, in this context, shown as a particularly preferred embodiment in FIG. 12.

The cylindrical or oval core, preferably the substantially cylindrical or oval wound part, has the first thorn-like extension at the trailing edge at the suction side and has the second thorn-like extension at the trailing edge at the pressure side, forming a channel with a flat base between the first and the second thorn-like extension. In particular, a relative and/or absolute profile thickness, which is defined as a ratio of profile thickness to profile depth, should decrease from a rotor blade root to a rotor blade tip.

The flat base of a channel between the first and the second thorn-like extension is preferably outwardly arched, at any rate in the region close to the hub of the hub region. Preferably, the flat base of a channel between the first and the second thorn-like extension is inwardly arched, at any rate in the region remote from the hub of the hub region.

In the case of the rotor blade, it is particularly preferable for the first and second thorn-like extension at the trailing edge to be arranged at a circumferential angle of below 60°, wherein the circumferential angle is measured proceeding from a profile axis, that is to say, in the absence of an angle of attack, proceeding from a horizontal.

In the context of a particular preferred refinement, in the hub region, in particular in the region close to the hub of the hub region, at the suction side, the first thorn-like extension at the trailing edge has a relative thorn depth which is smaller than a relative thorn depth of the second thorn-like extension at the trailing edge at the pressure side.

In the context of a particularly preferred refinement, in the hub region, in particular in the region close to the hub of the hub region, at the pressure side, the second thorn-like extension at the trailing edge has an orientation with a more pronounced inclination towards the pressure side than an orientation of the first thorn-like extension at the trailing edge at the suction side.

In the context of a particularly preferred further refinement, it is provided that, in the hub region, at the suction side, the first thorn-like extension at the trailing edge runs at a substantially fixed circumferential angle in the direction of the tip region, and at the pressure side, the second thorn-like extension at the trailing edge runs at a substantially decreasing circumferential angle in the direction of the tip region. In other words, for example, a suction-side thorn-like extension is arranged at a substantially fixed circumferential angle at a substantially fixed position between a 1 o'clock and 3 o'clock position, for example approximately at a 2 o'clock position, and a pressure-side thorn-like extension is for example arranged at a position between a 5 o'clock and 3 o'clock position; preferably so as to run with a continuously decreasing position from a 5 o'clock to a 3 o'clock position in the direction of the tip region.

Preferably, in the hub region, the first thorn-like extension at the trailing edge and the second thorn-like extension at the trailing edge converge, in particular at a position of a circumferential angle of 0° or at a negative circumferential angle. In other words, provision is advantageously made for the suction-side thorn-like extension and the pressure-side thorn-like extension to converge to form a pointed trailing edge; preferably at a circumferential angle of 0°; that is to say at a 3 o'clock position in the absence of an angle of attack/twist.

Provision is preferably made whereby, in the hub region, at the pressure side, the second thorn-like extension at the trailing edge has a profile, arched toward the pressure side, of a pressure-side underside, in particular a profile, arched toward the pressure side, of a pressure-side underside with increasing curvature—that is to say runs with a negative curvature, so to speak. In addition or alternatively, provision may be made whereby, in the hub region, at the pressure side, the second thorn-like extension at the trailing edge has a lip which is arched toward the pressure side, in particular a spoiler lip or Gurney flap, in particular with an aerodynamic transition to a profile, arched toward the pressure side, of a pressure-side underside.

It has been found that, with these abovementioned refinements, it is preferably possible to realize a rotor blade which, at the profile, has flow speeds of a normalized flow in the region of a channel between the first and the second thorn-like extension, in Ma, which lie between 0.01 Ma and at most 0.1 Ma, in particular between 0.02 Ma and at most 0.06 Ma.

It has also been found that, with these abovementioned refinements, it is preferably possible to realize a rotor blade which has a glide ratio (lift/drag ratio) which, at angles of attack (twist) of up to 5°, lie above 1 and below 10, and in particular, a glide ratio (lift/drag ratio) increases, and/or an angle of attack angle of attack (twist) of a profile of the rotor blade decreases, from a region close to the hub of the hub region (I) to a region remote from the hub of the hub region.

BRIEF DESCRIPTION OF THE SEVERAL VIEWS OF THE DRAWINGS

Embodiments of the invention will now be described below on the basis of the drawing. The drawing is not necessarily intended to illustrate the embodiments to scale; rather, the drawing is of schematic and/or slightly distorted form where expedient for explanatory purposes. With regard to additions to the teaching that emerges directly from the drawing, reference is made to the relevant prior art. Here, it must be taken into consideration that numerous modifications and changes may be made regarding the form and the detail of an embodiment without departing from the general concept of the invention. The features of the invention that are disclosed in the description, in the drawing and in the claims may be essential to the refinement of the invention both individually and in any desired combination. Furthermore, the scope of the invention encompasses all combinations of at least two of the features disclosed in the description, in the drawing and/or in the claims. The general concept of the invention is not restricted to the exact form or the detail of the preferred embodiment shown and described below, or restricted to a subject matter that would be restricted in relation to the subject matter claimed in the claims. Where dimensional ranges are stated, values lying within the stated ranges are also intended to be disclosed, and capable of being used and claimed as desired, as limit values. For the sake of simplicity, below, the same reference designations are used for identical or similar parts or parts with identical or similar function.

Further advantages, features and details of the invention will emerge from the following description of the preferred embodiments and from the drawing, in which:

FIG. 8 is a coordinate illustration (A) of the rose thorn profile of FIG. 7 with an associated flow profile (B);

FIG. 11 is a schematic contour illustration, in a plan view, of a preferred embodiment of a rotor blade, wherein, in the hub region (I), a thorn-like extension is provided—in a first modification of a preferred embodiment, the thorn-like extension is part of a trailing edge profile similar to that in FIG. 9 in FIG. 10, for example as a trailing edge box—in a second modification of a preferred embodiment, the thorn-like extension is formed in the hub region at a trailing edge, wherein the profile depth remains below the dashed line as trailing edge, a trailing edge box can for example be omitted;

FIG. 12 is a three-dimensional illustration of a preferred embodiment of a rotor blade in the hub region (I) with visible thorn-like extension in the hub region, wherein the profile depth remains below the dashed line as trailing edge as per the second modification, illustrated in FIG. 11, of a preferred embodiment;

DETAILED DESCRIPTION

Figure 1:
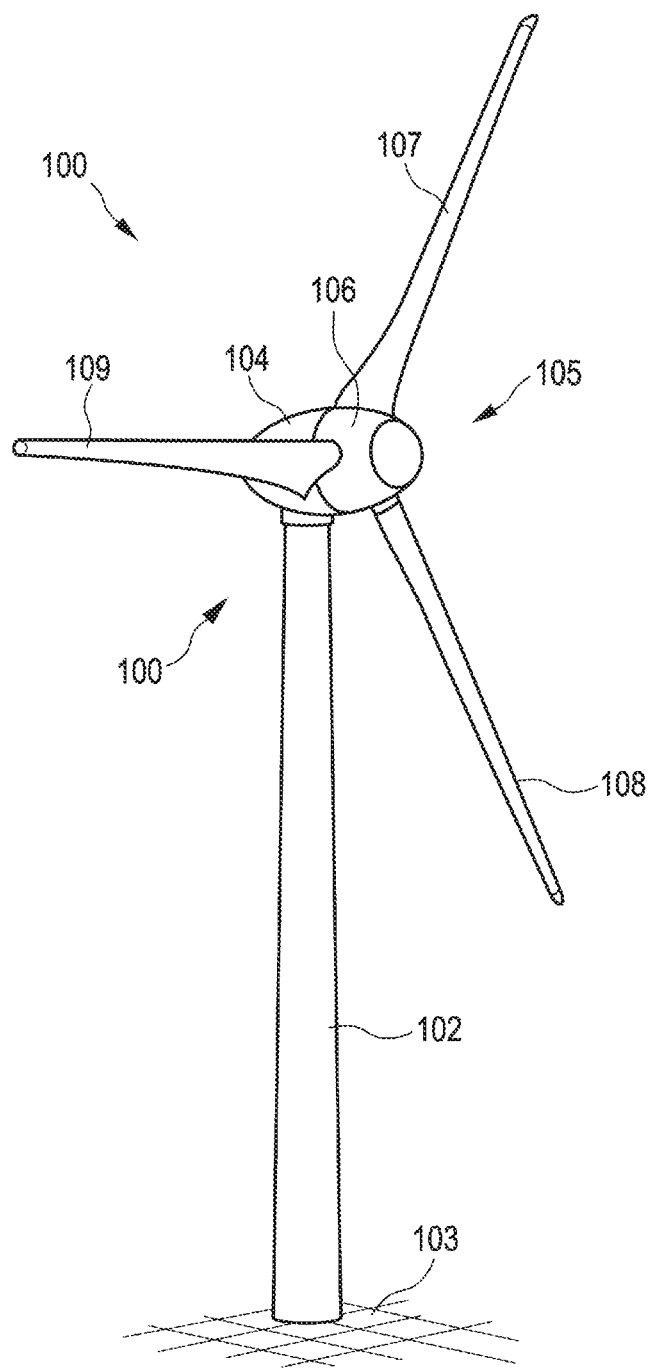
FIG. 1 is a schematic illustration of a preferred wind power installation.

FIG. 1 shows a wind power installation 100 having a tower 102 which is erected on a foundation 103. At the upper end situated opposite the foundation 103, there is situated a nacelle 104 (machine housing) with a rotor 105, which has a rotor hub 106 and rotor blades 107, 108 and 109 attached thereto. The rotor 105 is coupled to an electrical generator in the interior of the nacelle 104 for the purposes of converting mechanical work into electrical energy. The nacelle 104 is mounted rotatably on the tower 102, the foundation of which 103 provides the required stability.

Figure 2:
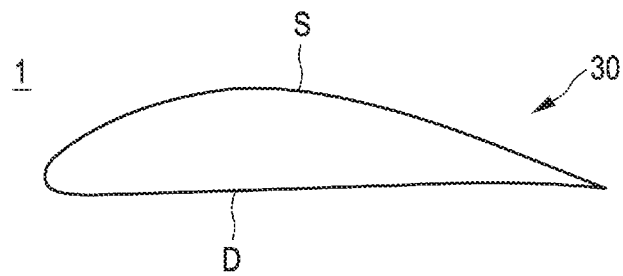
FIGS. 2-5 show preferred profile forms of a rotor blade for a preferred embodiment of a rotor blade in the tip region (III) (FIG. 2), in the central region (II) (FIG. 3) and in the hub region (I) (FIGS. 4 and 5)

For the tip region III, FIG. 2 shows a rotor blade profile 30 substantially conforming to a standard profile, wherein the suction side S is of substantially convex form, and the pressure side D is of substantially concave or straight form.

Figure 3:
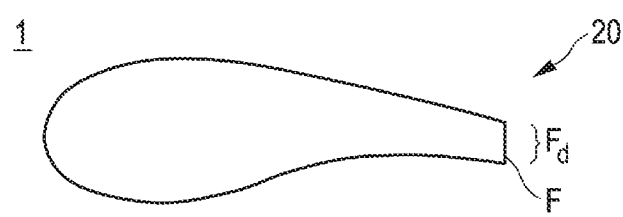

FIG. 3 shows a rotor blade profile 20 of a rotor blade 1 in the hub region with a truncated trailing edge F, wherein the trailing edge has a relative trailing edge thickness Fd, which may by all means lie in the range of 5% or higher. The profiles 30, 20 of FIG. 2, FIG. 3 may in each case also be present in the central region or hub region.

Figure 4:
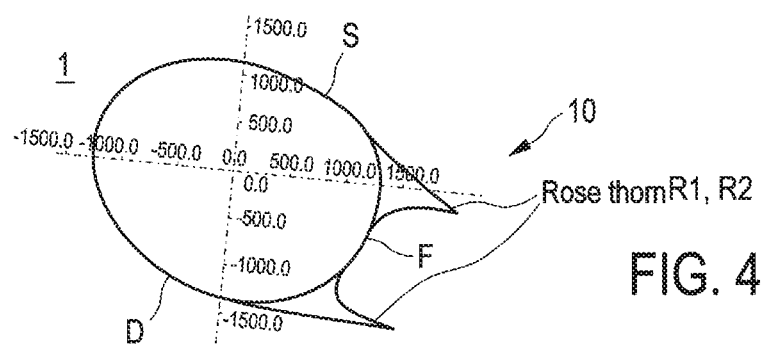

FIG. 4 shows, for a rotor blade 1 of the preferred embodiment, a rose thorn profile of a rotor blade profile 10. The rotor blade profile in the hub region I, as a thickness profile with a relative thickness of greater than 45% and a trailing edge of greater than 5%, has, at the suction and the pressure side S, D, in each case one rose thorn in the form of a thorn-like extension R1, R2. The thorn depth measured from the trailing edge lies below 25% and above a relative thickness of the trailing edge, specifically in particular above 5%. The rotor blade profile is shown already with an angle of attack (with twist), which, at any rate in the region close to the hub of the hub region, may lie between 0° and 70°, in particular between 0° and 45°, and in this case tends to increase.

Figure 5:
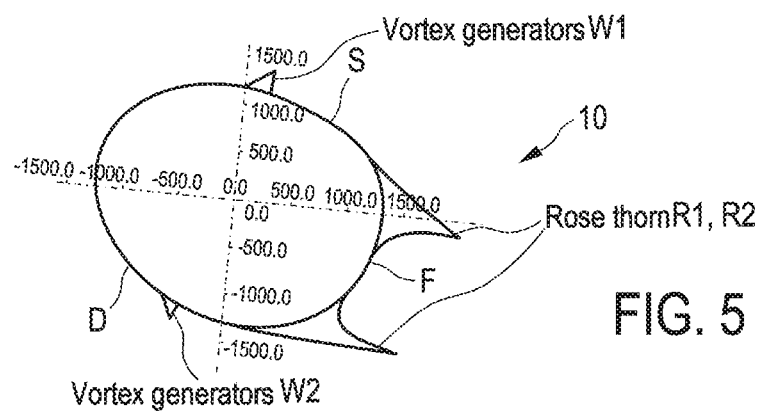

FIG. 5 shows the rotor blade profile of FIG. 4 with additional vortex generators W1, W2, wherein the vortex generators are arranged on the suction and the pressure side S, D.

Figure 6:
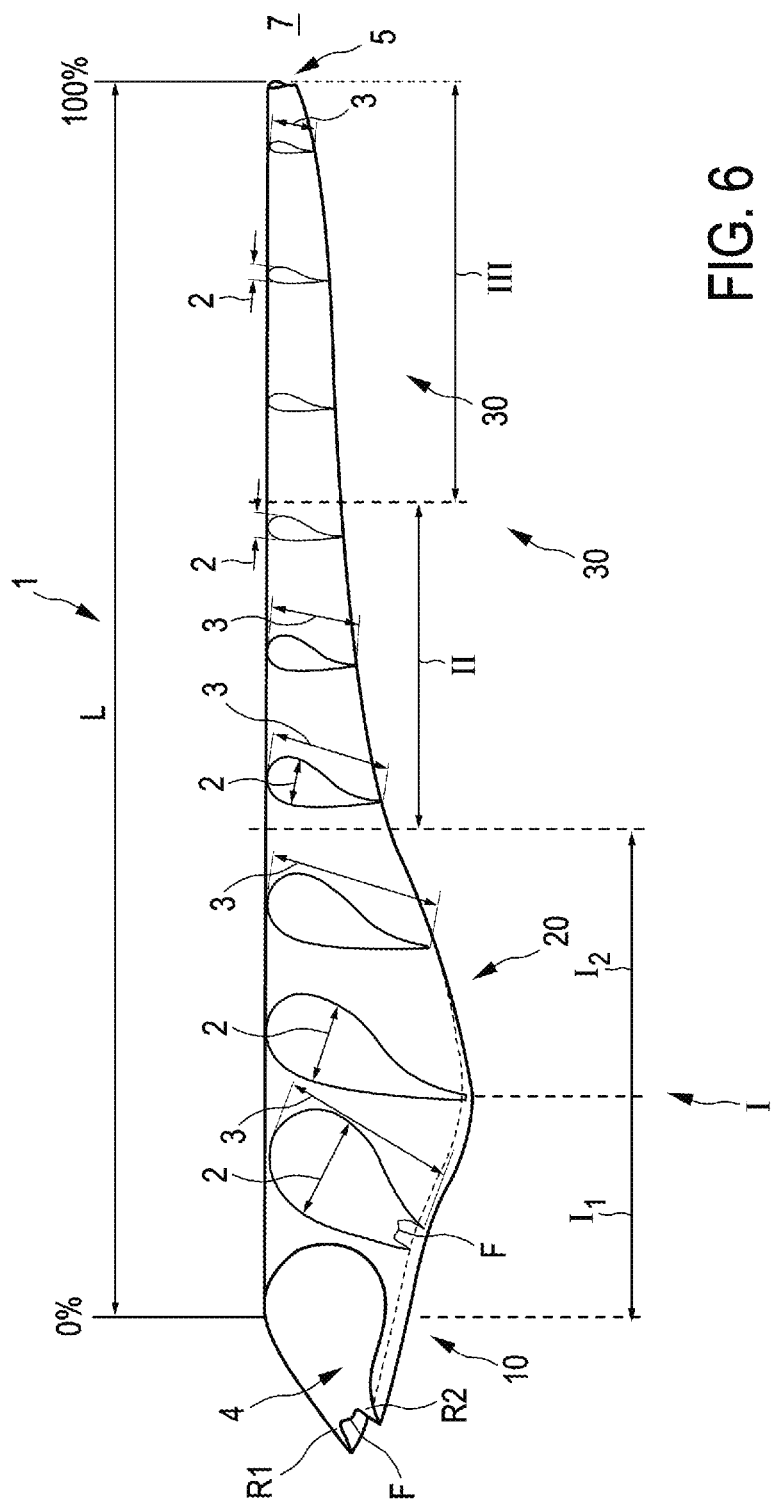
FIG. 6 shows a schematic progression of profile cross sections along a rotor blade from the hub region via the central region to the tip region.

FIG. 6 shows a distribution of different profile geometries of a rotor blade of an embodiment. In the rotor blade 1, profile thicknesses 2 and profile depths 3 are illustrated section by section. The rotor blade 1 has, at one end, the rotor blade root 4, and, at the end of here to therefrom, a connection region 5 for the attachment of a rotor blade tip. At the rotor blade root 4, the rotor blade has a large profile depth 3. In the connection region 5, the profile depth 3 is, by contrast, very much smaller. The profile depth increases considerably proceeding from the rotor blade root 4, which can also be referred to as profile root, as far as a central region II.

Figure 7:
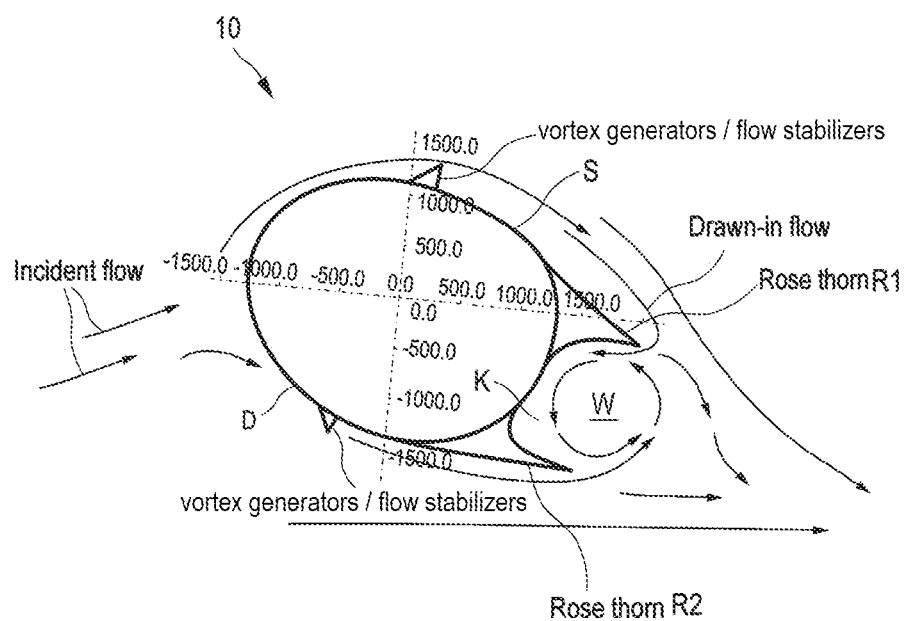
FIG. 7 is an illustration of a rose thorn profile of a rotor blade profile in the hub region with channel vortex in stabilized form.

FIG. 7 shows that, in the channel K of the blade profile between the suction-side rose thorn and the pressure-side rose thorn, that is to say in the channel between the suction-side and pressure-side thorn-like extensions R1, R2, a relatively stable channel vortex W in the direction of the suction side is formed. The channel vortex, which rotates anticlockwise, draws air from the suction side S into the channel K between the suction-side and pressure-side thorn-like extensions R1, R2, and prevents a detachment of the flow on the suction side. The pressure-side flow at the pressure side D additionally stabilizes the channel vortex W. Together with the relatively stable channel vortex, the blade profile in the hub region I thus has a profile depth lengthened by the channel vortex, such that a longer streamline is formed; the profile depth of the blade profile is, as it were, lengthened by the stable channel vortex. This leads to improved lift values, for as long as the channel vortex is stable. This is however ensured by the suction-side and pressure-side rose thorns of the thorn-like extensions. Furthermore, the rotor blade profile of FIG. 7 is equipped with vortex generators, such that a detachment of an incident flow in the boundary surface does not occur prematurely. This leads to stable pressure conditions for the channel vortex in the channel between the suction-side and pressure-side rows thorns of the thorn-like extensions of the blade profile. FIG. 7 shows a flow around the rotor blade with flows in the case of an angle of attack of 7°—the concept of the invention is however in no way restricted to such angles of attack, but is rather directed more to the less favorable situation of an angle of attack of 30°. However, FIG. 7 shows the basic principle and the possibility of saving a considerable amount of material through the use of the rose thorns. The turbulence generators can also be smaller than shown; the rose thorns thus become relatively smaller.

FIG. 8 shows, in (A), a coordinate illustration of the rose thorn profile of FIG. 7 with an associated flow profile (B); here, it is possible in particular to see the formation of the drawn-in flow, indicated in FIG. 7, as a stabilized vortex W between the thorns R1, R2.

Figure 9:
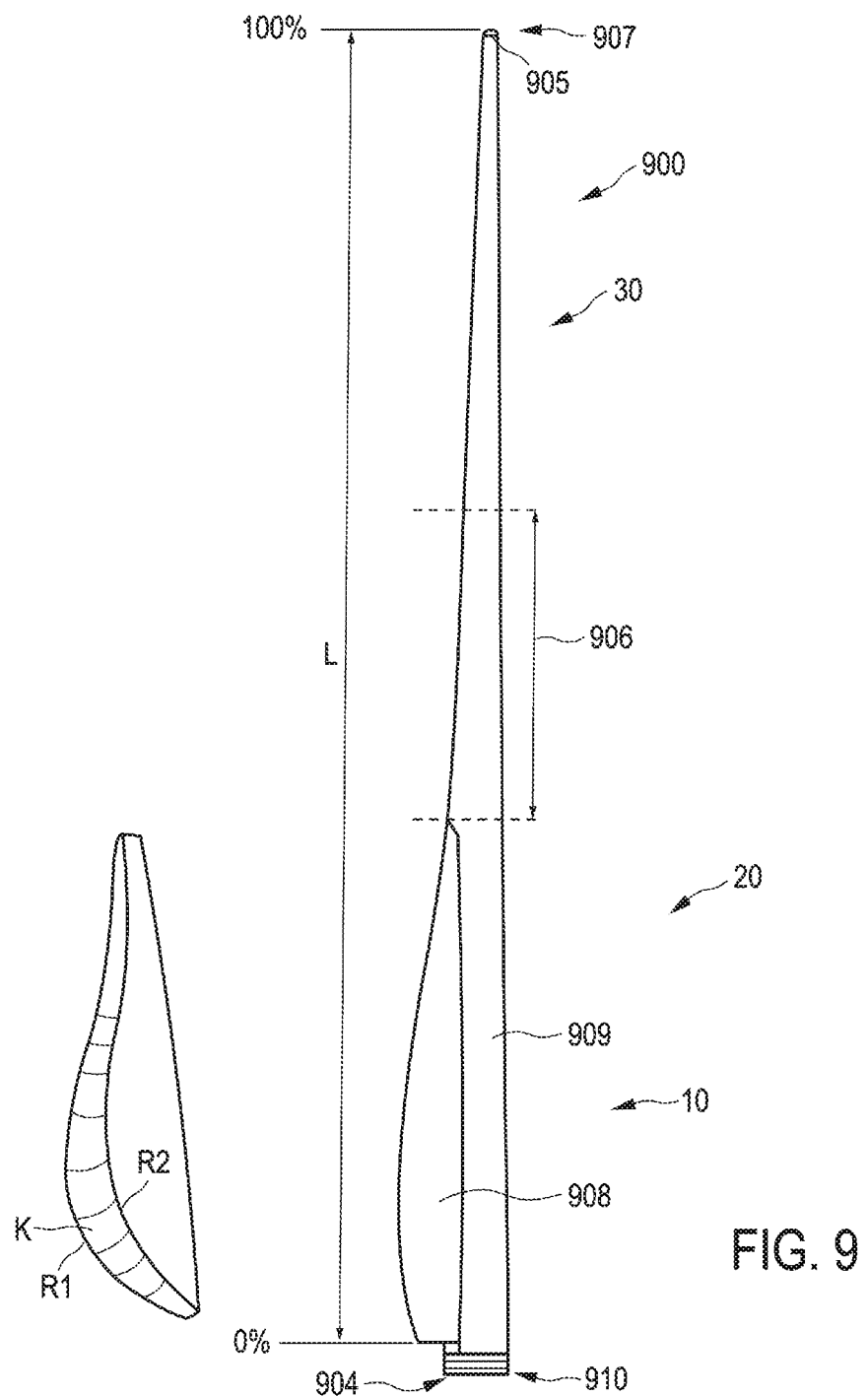
FIG. 9 shows a first side view along the length of the rotor blade with a trailing edge profile which bears the rose thorn profile of the preferred embodiment.

FIG. 9 shows a side view of a rotor blade 900 of an embodiment over its entire length 1, that is to say from 0% to 100%. The rotor blade 900 has, at one end, a rotor blade root 904 and, at the end of the therefrom, a rotor blade tip 907. The rotor blade tip 907 is connected to the rest of the rotor blade at an attachment region 905. At the rotor blade root 904, the rotor blade has a large profile depth. By contrast, the profile depth is very much smaller in the attachment region 905 and at the rotor blade tip 907. Proceeding from the rotor blade root 904, which can also be referred to as profile root, the profile depth decreases considerably as far as a central region 906. In the central region 906, there may be provided a parting point (not illustrated here). From the central region 906 to the attachment region 905, the profile depth is approximately constant.

The rotor blade 900 has a two-part form in the region of the rotor blade root 904. The rotor blade 900 is thus composed of a main profile 909, on which, in the region of the rotor blade root 904, a further section 908 is arranged for the purposes of increasing the rotor blade depth of the rotor blade 900. The section 908 is in this case for example adhesively bonded to the main profile 909. Such a two-part form is easier to handle during transport to the erection site, and is easier to manufacture.

Furthermore, FIG. 9 shows a hub attachment region 910. By means of the hub attachment region 910, the rotor blade 900 is attached to the rotor hub.

Figure 10:
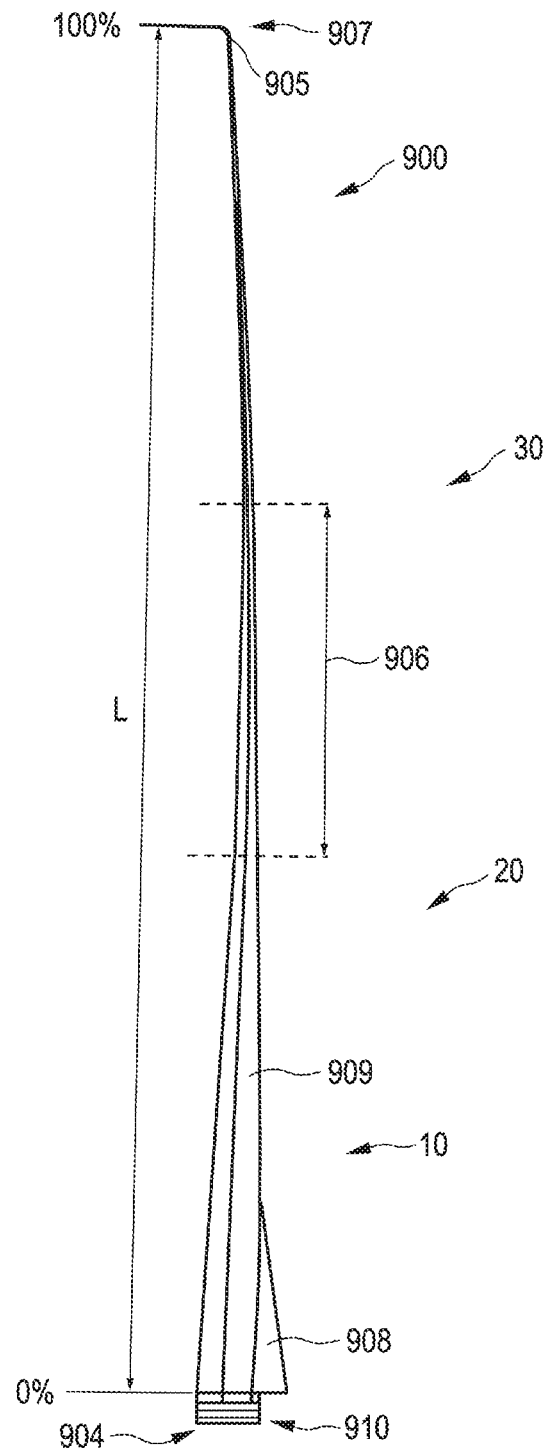
FIG. 10 shows another view of the rotor, wherein, in FIG. 10, the trailing edge profile is formed with a rose thorn profile and is shown in one case with a serrated form and in one case without a serrated form.

FIG. 10 shows a further side view of the rotor blade 900 of FIG. 9. It is possible to see the rotor blade 900 with the main profile 909, with the section 908 for increasing the rotor blade depth, the central region 906, the rotor blade root 904 and the hub attachment region 910, and also the attachment region 905 to the rotor blade tip 907. The rotor blade tip 907 is formed as a so-called winglets. In this way, vortices at the rotor blade tip are reduced.

In the detail of FIG. 9, the section 908 is shown as a trailing edge piece with the channel K between the suction-side and the pressure-side rose thorn R1, R2. Altogether, however, the depth of the trailing edge piece is smaller because, owing to the preferred stable channel vortex formation, the effective relative profile thickness of the blade profile in the hub region is increased.

In the detail of FIG. 10, the trailing edge piece is shown, on the one hand, in view A, without a serrated form, and, on the other hand, in view B, with a serrated form. Depending on requirements, it is possible in particular by means of a serrated form or other flow-stabilizing measures to assist the channel vortex formation and thus increase the effective relative profile thickness of the blade profile in the hub region.

FIG. 11 shows a preferred embodiment, which can be seen in the upper part, as a first modification with a trailing edge piece—for example in the form of a trailing edge box which is attached separately—as already shown as section 908 in FIG. 9 and FIG. 10.

The rotor blade 1, which is correspondingly shown with an profile depth increased in the hub region I, has been described in particular in conjunction with FIG. 9 and FIG. 10—with the trailing edge piece with thorn-like extension, that is to say as section 908, the depth of the trailing edge piece is, for similar lift and glide values, smaller than in the case of a trailing edge piece without thorn-like extension. The profile depth of a rotor blade 1 of said type can thus be relatively reduced owing to the abovementioned stable channel vortex formation, such that an effective relative profile thickness of the blade profile in the hub region can be increased. Since, owing to the preferred stable channel vortex formation, the effective relative profile thickness of the blade profile increases in the hub region, this is suitable preferably, but not imperatively, for the implementation of a rotor blade 1 as shown in FIG. 6.

FIG. 11 also shows a further particular preferred embodiment as second modification, which is referred to here as a rotor blade 1'. In this second modification, the thorn-like extension is formed in the hub region "directly" at a trailing edge F of the core of the rotor blade, wherein the thorn-like extension R1, R2 remains below the dashed line L'; the dashed line L' thus forms the trailing edge of the thorn-like extension R1, R2. The trailing edge piece 908 of the rotor blade 1 is omitted in the case of the rotor blade 1'.

The profile depth of the rotor blade 1' is thus restricted to a region below the dashed line L'. The rotor blade 1' is thus formed with a considerably smaller profile depth (chord length) while nevertheless, as shown, maintaining considerable and advantageous lift and glide values. This leads to a very considerable reduction and thus considerably improved transportability of the rotor blade 1'.

The rotor blade 1' can be produced particularly efficiently in the hub region I by virtue of the thorn-like extension being attached, in particular only the thorn-like extension (as in this case in this embodiment shown in FIG. 12) being attached, to the core as the abovementioned thickness profile with a relative thickness of greater than 50%, in particular greater than 75%—that is to say to the trailing edge of the core with a relatively large trailing edge thickness.

Figure 13:
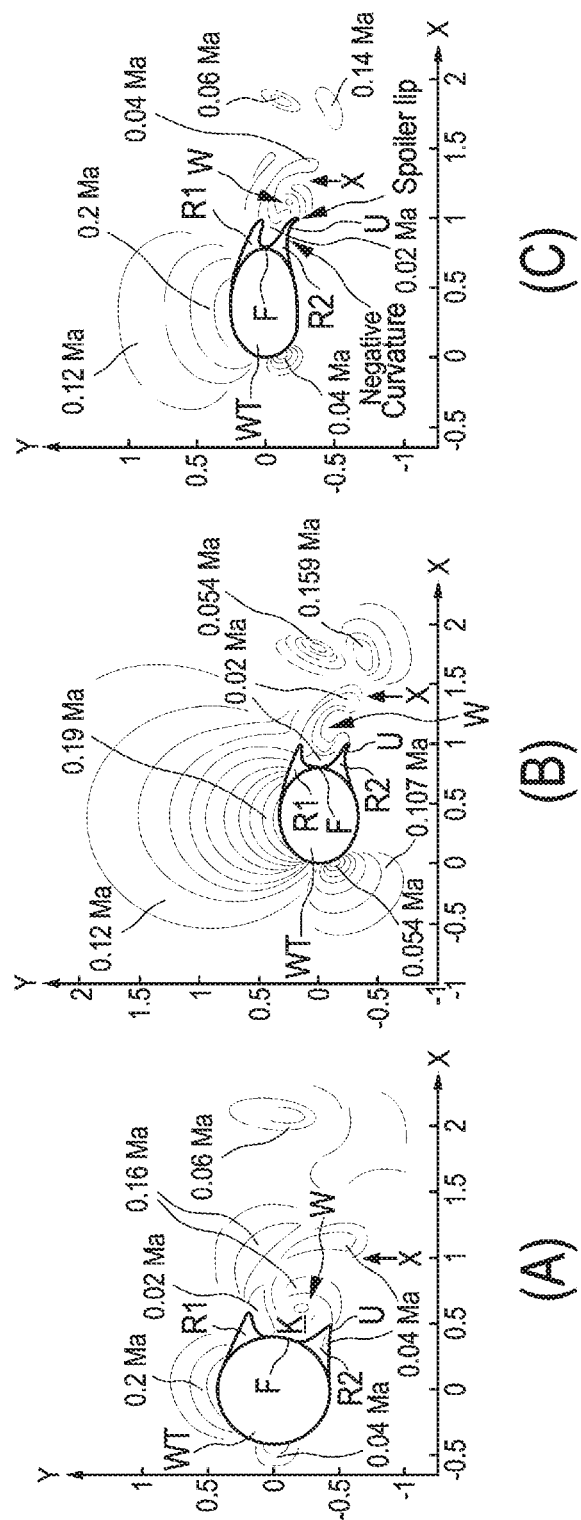
FIG. 13 shows (A) a first thickness profile in the region close to the hub (I.1) of the hub region (I), (B) a second thickness profile in the central hub region (I), and (C) a third thickness profile in the region remote from the hub (I.2) of the hub region of the rotor blade of FIG. 12—all thickness profiles have a speed distribution normalized in relation to the speed of sound and, identifiable from this, a channel vortex in a channel between the first and the second thorn-like extension, wherein the flow speeds lie in the range of between 0.01 Ma and at most 0.1 Ma, in particular between 0.02 Ma and at most 0.06 Ma.

A substantially cylindrical or oval wound part with a thickness profile of an advantageous relative thickness of greater than 50%, in particular greater than 75%, progresses from a hub region remote from the hub I.2 to a region close to the hub I.1, as can be clearly seen for example in FIG. 13, to a cylindrical thickness profile of an advantageous relative thickness of up to 100% in the attachment region of the hub.

For the rotor blade 1', and also for the rotor blade 1, a parting point R is provided, at which the rotor blade 1, 1' is assembled in a longitudinal direction.

FIG. 12 shows a three-dimensional illustration of a preferred embodiment of a rotor blade in the hub region (I), with a thorn-like extension visible in the hub region, wherein, in the hub region, in a first region close to the hub, the thickness profile has the thorn-like extension at its trailing edge, and also in a second region, specifically in the hub region in a second region remote from the hub, the thickness profile has the trailing edge a flat trailing edge the thorn-like extension.

The rotor blade 1' is, for its hub region I, illustrated in FIG. 12 in a perspective view with a parting point R widened in a bead-like manner. The perspective illustration of the rotor blade 1' in FIG. 12 shows that the thickness profile in the hub region I is formed as a substantially elliptical core 11' and then, developing in the longitudinal direction toward the hub, oval and then cylindrical core 11', which is formed as a wound part WT, as is correspondingly indicated in FIG. 13.

A first thorn-like extension R1 is attached at the suction side S of the core 11', and a second thorn-like extension R2 is attached at the pressure side D of the core 11', specifically in each case at the trailing edge F of said core. In this way, a channel K which is visible in FIG. 12 is formed, specifically at the trailing edge F between the suction-side thorn-like extension R1 and the pressure-side thorn-like extension R2, with a substantially flat base, formed by the trailing edge F, between the first and the second thorn-like extension R1, R2.

FIG. 13 shows, in conjunction with FIG. 12 and FIG. 11, for the cross sections A-A and B-B and C-C shown in FIG. 11, in the views (A), (B) and (C) of FIG. 13, the corresponding profiles with a relative thickness of greater than 50% and then greater than 75% and finally practically 100% of the rotor blade 1' toward the hub—in this regard, a calculated distribution of flow speeds is shown. The flow speeds are illustrated as shading, and make it possible to see the channel vortex W in the channel K between the thorn-like extensions R1, R2 on the wound part WT—this will be referred to further below.

It is possible from the profiles of FIG. 13, in the views (A), (B) and (C), to see that a relative and/or absolute profile thickness 2, which is defined as a ratio of profile thickness 2 to profile depth 3 (see FIG. 6), increases from a rotor blade tip 5, 7 to a rotor blade root 4; specifically, a relative profile thickness of initially below 45% increases to above 50%, then increases to above 75%, up to a relative profile thickness of practically 100% of a cylindrical blade attachment at the rotor blade root 4 or hub it can also be seen that the flat base of a channel K—that is to say formed by the practically flat trailing edge F of the rotor blade 1'—is outwardly arched between the first and the second thorn-like extension R1, R2 in the case of a profile close to the hub (as illustrated in view (A) of FIG. 13). Thus, whereas it is the case in the region close to the hub I.1 that the base is outwardly arched, said base is relatively flat in a central hub region I (illustrated in this case in view (B) of FIG. 13), and said base is inwardly arched in a region remote from the hub I.2 of the hub region I (as can be seen in view (C) of FIG. 13).

It can also be seen from FIG. 12 that the first and the second thorn-like extension R1, R2 at the trailing edge F are arranged at a circumferential angle of below 60°, specifically in this case at a circumferential angle $\alpha 1$, $\alpha 2$, shown in FIG. 12, of approximately 45°. The circumferential angle $\alpha 1$, $\alpha 2$ of the thorn-like extensions R1, R2 is in this case measured proceeding from a profile axis (profile chord A of the profile of the rotor blade 1').

The circumferential angle $\alpha 1$ at the suction side S of the first thorn-like extension R1 at the trailing edge F now runs at a substantially fixed circumferential angle $\alpha 1$ in the direction of the tip region. At the pressure side D, the circumferential angle $\alpha 2$, as can be seen in FIG. 12, for the second thorn-like extension R2 at the trailing edge F decreases in the direction of the tip region III. That is to say, the thorn-like extensions R1, R2 converge on one another, in order to merge at the intersection point T at the end of the hub region I. This corresponds approximately to a position at which the circumferential angle for both rose thorn profiles R1, R2 lies at approximately 0° or above, possibly at the fixed circumferential angle α1.

As can be seen in FIG. 12, provision is made whereby, in the hub region I, in a first region, specifically in a region close to the hub I.1 in the hub region I, the thickness profile has a relatively large first relative thickness and the thorn-like extension at its flat trailing edge. Provision is furthermore made whereby, in the hub region I, in a second region, in particular in a region remote from the hub I.2 in the hub region I, the trailing edge of the thickness profile has a pointed trailing edge without a thorn-like extension, or a flat trailing edge with a second, relatively small relative thickness and likewise with the thorn-like extension.

The pressure-side thorn-like extension R2 follows, as it were, the twist of the rotor blade 1'; that is to say, the decreasing angle of attack γ in the direction of the tip region III—this was already visible from FIG. 6, and is shown clearly once again in FIG. 12. In a central region, which is only partially illustrated here, the profile of the rotor blade already has a pointed trailing edge, which is formed from the converging first and second thorn is R1, R2 of the suction side and pressure side. In other words, the rotor blade 1' has a truncated trailing edge (FIG. 3) which is formed from the converging first and second thorns of the suction side and pressure side, wherein a relative trailing edge thickness lies in the region of 5% or below—in a tip region which is not illustrated here, the profile of the rotor blade has a pointed trailing edge (FIG. 2).

It can also be seen that, in the region close to the hub I.1 of the hub region I, at the suction side, the first thorn-like extension R1 at the trailing edge F has a relative thorn depth which is smaller than a relative thorn depth of the second thorn-like extension R2 at the trailing edge F at the pressure side D of the rotor blade 1'. It can also be seen from FIG. 12 that, in the region close to the hub of the hub region I, at the pressure side, the second thorn-like extension R2 at the trailing edge has an orientation with a more pronounced inclination toward the pressure side than an orientation of the first thorn-like extension R1 at the trailing edge at the suction side S. This can be seen from the fact that the orientation angle β1 for the first thorn-like extension R1 is greater than the orientation angle β2 for the second thorn-like extension R2.

Furthermore, for the second thorn-like extension R2 at the trailing edge F, a profile, arched toward the pressure side D, of a pressure-side underside R2u of the thorn-like extension R2 is provided. That is to say, for the pressure-side underside U of the second thorn-like extension R2, a profile arched toward the pressure side D with an increasing curvature is provided. The lift effect that can thus be achieved can additionally be further intensified by means of a so-called arched lip; for example a spoiler lip or a Gurney flat or the like, as can be seen in view (C) of FIG. 13. This leads to a boosting of the pressure on the pressure side D, and thus to increased lift values.

It can be seen that this embodiment as illustrated in FIG. 12 and FIG. 11 as a rotor blade 1' realizes flow speeds in the region of the channel K which lie between 0.01 Ma and 0.1 Ma, and is thus particularly effective in supporting and stabilizing a channel vortex formation W.

Figure 14:
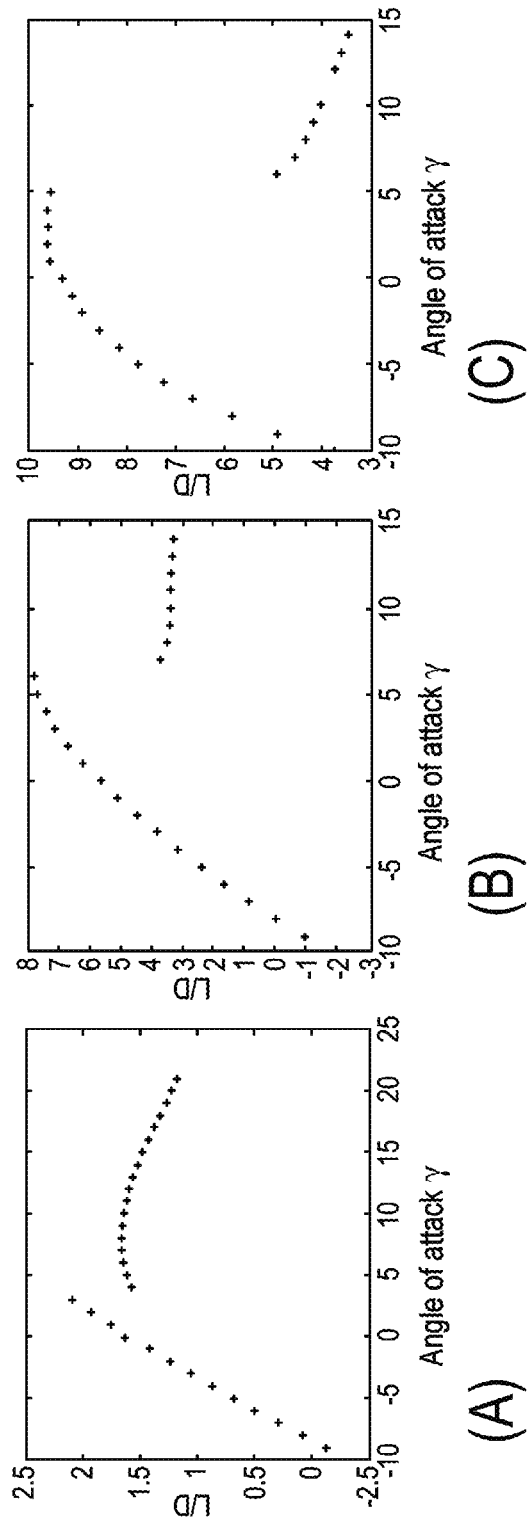
FIG. 14 shows, in views (A), (B) and (C), in each case glide ratios (left/drag ratios) of the thickness profiles of the views (A), (B) and (C) of FIG. 13 for a rotor blade of the second alternative modification as per FIG. 12 and FIG. 13, wherein improved lift is realized owing to the effective profile depth being lengthened by means of the channel vortex.

A glide ratio (lift/drag ratio), as illustrated for views (A), (B) and (C) in FIG. 13 and FIG. 14 (that is to say for the cross sections A-A, B-B and C-C of FIG. 11), is still relatively high; specifically, in the case of angles of attack γ of up to 5° for the section A-A, said glide ratio still assumes values of at least 2.5, for section B-B, said glide ratio still assumes values of up to 8, and for the section C-C, said glide ratio still assumes values of up to even 10. These are glide ratios which can ultimately be realized owing to the "effective" increase of the profile depth owing to the stabilized channel vortex W, as can be seen from FIG. 13, even though the structural profile depth of the rotor blade 1' is considerably smaller.

In other words, as can be seen in FIG. 13, the "effective" profile depth of the rotor blade 1' is lengthened beyond the actual trailing edge F (as it were owing to the channel vortex); in particular, it is lengthened by at least 20% but at least 50%—or beyond the trailing edge of the thorn-like extensions R1, R2 by up to 20% but at least up to 10%.

This advantageous effect is particularly pronounced as a result of the fact that a flow separation is first evident downstream of the vortex W, whereas the flow does not detach from a structural trailing edge of the thorn-like extension.

The invention claimed is:

1. A rotor blade for a wind power installation, comprising:
    a suction side;
    a pressure side;
    a hub region;
    a tip region;
    a rotor blade root at the hub region, the rotor blade root being configured to attach the rotor blade to a rotor hub; and
    a rotor blade tip at the tip region;
    wherein in a region of the hub region, a trailing edge of the rotor blade has, at least in part, a thickness profile having a thorn-like extension,
    wherein the thorn-like extension includes at least one of:
        a first thorn-like extension at the trailing edge at the suction side, and
        a second thorn-like extension at the trailing edge at the pressure side,
    wherein in the region of the hub region, the thickness profile has, at least in part, at least one of: a flow stabilizer or a vortex generator, on at least one of: the suction side or pressure side, and
    wherein the thorn-like extension forms a channel having a substantially flat base between the first and the second thorn-like extensions, wherein a relative or an absolute profile thickness that is defined as a ratio of a profile thickness to a profile depth decreases from the rotor blade root to the rotor blade tip.

2. The rotor blade as claimed in claim 1, wherein, in the region of the hub region, the thickness profile has, at least in part, a relative thickness of greater than 40%.

3. The rotor blade as claimed in claim 1, wherein, in the hub region, the trailing edge is a flat or curved trailing edge having a relative thickness of greater than 5%.

4. The rotor blade as claimed in claim 1, wherein a relative thorn depth of the thorn-like extension measured from the trailing edge is below 25% or at least above a relative thickness of the trailing edge.

5. The rotor blade as claimed in claim 1, wherein in the region of the hub region, the trailing edge is, at least in part, serrated.

6. The rotor blade as claimed in claim 1, wherein, in the region of the hub region, the thickness profile has the flow stabilizer on at least one of: the suction side or the pressure side, the flow stabilizer being selected from the group comprising: a spoiler, a boundary-layer fence, or a boundary-layer suction device.

7. The rotor blade as claimed in claim 1, wherein in the region of the hub region, the thickness profile has, at least in part, the vortex generator on at least one of: the suction side or pressure side, the vortex generator being selected from the group comprising: a fin, a stud, a dimple, a web, a blow-out structure, or a suction structure.

8. The rotor blade as claimed in claim 1, wherein:
in the hub region, in a first region, the thickness profile has a first relative thickness and the first thorn-like extension at a flat trailing edge, and
in the hub region, in a second region, the trailing edge of the thickness profile has a pointed trailing edge without a thorn-like extension or has a flat trailing edge with a second relative thickness and with the thorn-like extension.

9. The rotor blade as claimed in claim 1, wherein:
in the hub region, in a first region, the thickness profile has the thorn-like extension at its flat trailing edge, and
in the hub region, in a second region, in particular in a region remote from the hub in the hub region, the trailing edge of the thickness profile has a flat trailing edge without the thorn-like extension.

10. The rotor blade as claimed in claim 1, wherein the thickness profile has a maximum profile depth in the hub region between a first region and a second region, wherein the first region is closer to the hub than the second region.

11. The rotor blade as claimed in claim 1, wherein the relative profile thickness that is defined as a ratio of the profile thickness to the profile depth has a local maximum in a central region between the rotor blade root of the hub region and rotor blade tip of the tip region.

12. The rotor blade as claimed in claim 11, wherein the relative profile thickness of the local maximum is between 35% to 50%.

13. The rotor blade as claimed in claim 11, wherein the rotor blade has an absolute profile depth of 1500 mm to 3500 mm in the region of the local maximum.

14. The rotor blade as claimed in claim 1, wherein:
the rotor blade includes a first rotor blade section and a second rotor blade section, and
the first rotor blade section includes the rotor blade root and the second rotor blade section includes the rotor blade tip, and
the first and the second rotor blade sections are connected to one another at a parting point,
wherein the parting point is arranged at least one of:
in a central region between the rotor blade root and rotor blade tip, or
in a region of a local maximum of the relative profile thickness that is defined as a ratio of the profile thickness to the profile depth.

15. The rotor blade as claimed in claim 1, wherein the rotor blade, in a first region in the hub region, has an absolute profile depth of at least 3900 mm.

16. The rotor blade as claimed in claim 1, wherein the rotor blade has, in the range from 90% to 95% of the total length proceeding from the rotor blade root, an absolute profile depth less than 1000 mm.

17. The rotor blade as claimed in claim 1, wherein the rotor blade has, in a central region, a profile depth corresponding to 20% to 30% of the profile depth in the hub region.

18. The rotor blade as claimed in claim 1, wherein in the region of the hub region, the thickness profile has, at least in part, a relative thickness of greater than 50%, wherein the thickness profile is realized in the form of a substantially cylindrical or oval core.

19. The rotor blade as claimed in claim 1, wherein the first and the second thorn-like extensions at the trailing edge are arranged at a circumferential angle of less than 60°, wherein the circumferential angle is measured proceeding from a profile axis in an absence of an angle of attack.

20. The rotor blade as claimed in claim 1, wherein in the hub region at the suction side, the first thorn-like extension at the trailing edge has a relative thorn depth that is smaller than a relative thorn depth of the second thorn-like extension at the trailing edge at the pressure side.

21. The rotor blade as claimed in claim 1, wherein in the hub region at the pressure side, the second thorn-like extension at the trailing edge has an orientation with a more pronounced inclination toward the pressure side than an orientation of the first thorn-like extension at the trailing edge at the suction side.

22. The rotor blade as claimed in claim 1, wherein:
in the hub region at the suction side, the first thorn-like extension at the trailing edge extends at a substantially fixed circumferential angle in a direction of the tip region, and
at the pressure side, the second thorn-like extension at the trailing edge extends at a substantially decreasing circumferential angle in the direction of the tip region.

23. The rotor blade as claimed in claim 1, wherein in the hub region, the first thorn-like extension at the trailing edge and the second thorn-like extension at the trailing edge converge.

24. The rotor blade as claimed in claim 1, wherein in the hub region at the pressure side, the second thorn-like extension at the trailing edge has a profile arched toward the pressure side of a pressure-side underside.

25. The rotor blade as claimed in claim 1, wherein in the hub region at the pressure side, the second thorn-like extension at the trailing edge has a lip that is arched toward the pressure side, wherein the lip is a spoiler lip or Gurney flap.

26. The rotor blade as claimed in claim 1, wherein flow speeds of a normalized flow in the region of a channel between the first and the second thorn-like extension are between 0.01 Ma and 0.1 Ma.

27. The rotor blade as claimed claim 1, wherein a glide ratio at angles of attack of up to 5° are between 1 and 10, wherein at least one of: a glide ratio increases or an angle of attack of a profile of the rotor blade decreases from a region of the hub region that is close to the hub to a region of the hub region that is remote from the hub.

28. A wind power installation having a rotor, wherein the rotor has at least one rotor blade as claimed in claim 1.

29. A rotor blade for a wind power installation, comprising:
a suction side;
a pressure side;
a hub region;
a tip region;
a rotor blade root at the hub region, the rotor blade root being configured to attach the rotor blade to a rotor hub; and
a rotor blade tip at the tip region;
wherein in a region of the hub region, a trailing edge of the rotor blade has, at least in part, a thickness profile having a thorn-like extension,
wherein the thorn-like extension includes at least one of:
a first thorn-like extension at the trailing edge at the suction side, and
a second thorn-like extension at the trailing edge at the pressure side,
wherein in the region of the hub region, the thickness profile has, at least in part, at least one of: a flow stabilizer or a vortex generator, on at least one of: the suction side or pressure side, wherein a flat base of a channel between the first and the second thorn-like extension is outwardly arched in a region close to the hub of the hub region and is inwardly arched in a region remote from the hub of the hub region.

\* \* \* \* \*